Figure 1:
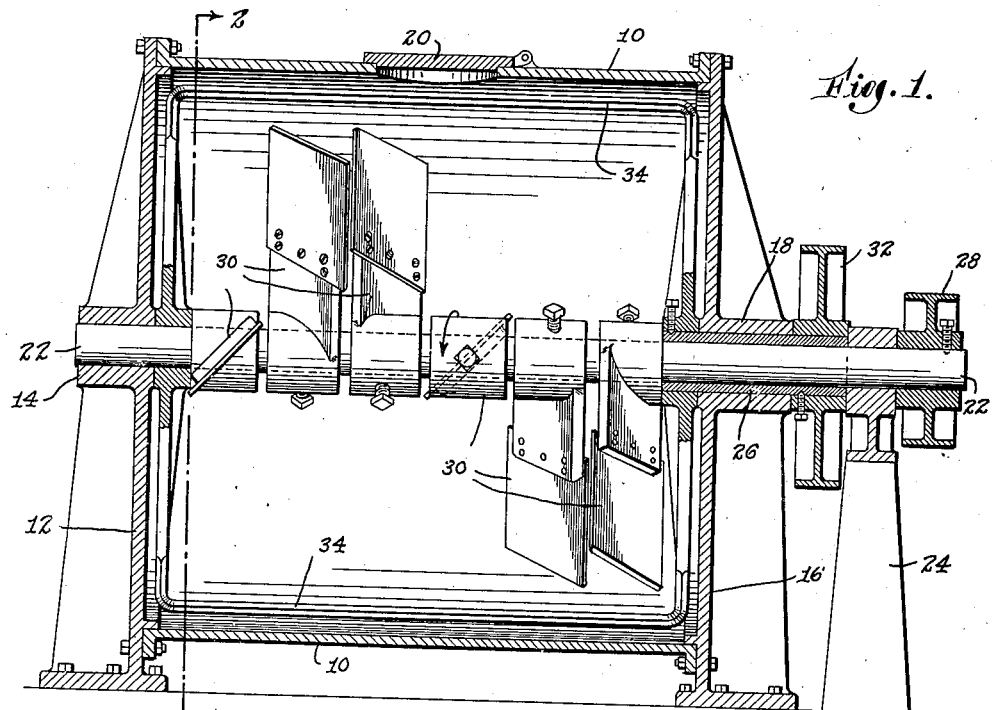

June 14, 1938.  E. BILLINGS ET AL  2,120,540
MANUFACTURE OF CARBON BLACK
Filed July 18, 1932

Inventors
Harold H. Offutt & Edmund Billings
by Kenway & Witter
Attorneys

UNITED STATES PATENT OFFICE 2,120,540

MANUFACTURE OF CARBON BLACK

Edmund Billings, Weston, and Harold H. Offutt, Winchester, Mass., assignors to Godfrey L. Cabot, Inc., Boston, Mass., a corporation of Massachusetts Application July 18, 1932, Serial No. 623,184

4 Claims. (Cl. 134—60)

This invention relates to improvements in the manufacture of carbon black and more particularly to a novel process of manufacturing from flocculent carbon black a new product consisting of carbon black in the form of granules of relatively high apparent density and of sufficient cohesion to withstand handling in bulk. The granules may be made substantially spherical in shape and the surfaces thereof may, if desired, be polished.

In the manufacture of carbon black as it is at present carried out by one commercial method, the black as removed from the channel surfaces, bolted to remove grit and delivered to settling or agitating tanks, has an apparent density of between 3 and 7 pounds per cubic foot. The carbon black so delivered is stirred slowly by rotating blades, consisting of rods or flat shapes extending radially from a shaft revolved at a rate of from 4 to 20 R. P. M. This gentle agitation results in a slow settling of the very light carbon black particles and a freeing of the mass from entrained air. The viscosity of the mass increases as settling proceeds, and in practice it has been found necessary to withdraw or pack off the black from the agitating tank before its density exceeds 15 pounds per cubic foot.

After the black has been removed from the agitating tanks, it is packed under pressure in bags or sacks. In this step it is customary to use a screw conveyor or feeder rotating about a vertical axis and arranged to force itself up out of the sack as the black is delivered and forced into the same. The resulting package is of a density termed "uncompressed" in the trade and does not usually exceed 15 pounds per cubic foot in apparent density.

A further increase in the density of the black is usually obtained by briqueting the packed sacks in powerful hydraulic or mechanical presses, and in this way a maximum apparent density of 27 to 30 pounds per cubic foot is attained.

The steps above outlined are necessary in order to bring the light flocculent carbon black into a condition in which it can be handled economically and conveniently in packaging for distribution, as well as into convenient shape for the consumer to use. For example, the light fragile particles of carbon black as it is first produced not only occupy enormous volume in mass but are likely to be scattered and diffused by every breath of air, and probably repel each other on account of static electrical conditions to which they are subject.

The present invention rests upon the discovery that by subjecting a mass of carbon black particles, in a dry state, to multi-directional pressure the carbon black is converted into granules which are relatively tenacious in structure, relatively non-coherent and non-adherent of surface and of an apparent density in bulk of more than 20 pounds per cubic foot. This conversion of flocculent carbon black to granular form is effected without the use of any binding ingredient whatever and the agglomeration of the particles is, so far as we understand the phenomenon, by reason of impact-generated cohesion of the carbon black itself. The novel product thus produced, which may preferably be of substantially spherical granular shape, possesses striking commercial advantages. In the first place, it is substantially dustless in that most of its particles are agglomerated into granules of appreciable size and substantial density. In the second place, the non-adherent character of the surfaces of the granules reduces the apparent viscosity of the mass, which viscosity may be further reduced by the preferred spherical form of the granules, permitting the carbon black to be conveyed through pipes by gravity or by streams of air, to be transported in tank cars and to be stored in bulk. Beside being much more cleanly for the consumer to handle, the novel product when mixed with other ingredients disperses and diffuses more completely and perfectly in various compounded materials than commercial carbon black of forms heretofore known.

The precise steps leading to the production of this new product of manufacture may be varied to some extent so long as each nucleus or center is subjected to impact or pressure from substantially every direction. One manner of securing satisfactory condition is to maintain the carbon black for a sufficient interval of time in a state approaching perfect turbulence, and by this we mean that each particle has such freedom of motion and is associated with other particles in sufficient number to insure the multi-directional pressures or impacts required. For example, a charge of commercial carbon black may be converted into the desired granular form by being properly agitated in a drum so that the requisite pressures result from the impact of the agitating blades, the impact of one particle against another and the impact of the particles against the walls of the drum as we understand the phenomena.

Another manner in which the desired results may be secured is by treating a charge of commercial carbon black in a ball mill of the horizontal drum type. In this case, the requisite pressures may be derived principally from the rolling impact of the particles as they drop from particle to particle in rolling down the surface of the shifting mass in the mill.

In whatever apparatus the carbon black is treated, the process of conversion to the desired granular form is expedited by including in the mass a quantity of carbon black in its final form, that is to say, a mother or priming charge in granular form. The explanation of this probably is that an increased number of pressure supplying units is thereby provided so that the agglomeration, shaping and compacting of the individual dense grains takes place more rapidly than under conditions wherein the balling of the carbon black is brought about in an amorphous mass. The introduction into the process of this seeding or priming step is advantageous principally because it reduces the time required for effecting a complete agglomeration or conversion of the charge but it is not otherwise essential.

Figure 2:
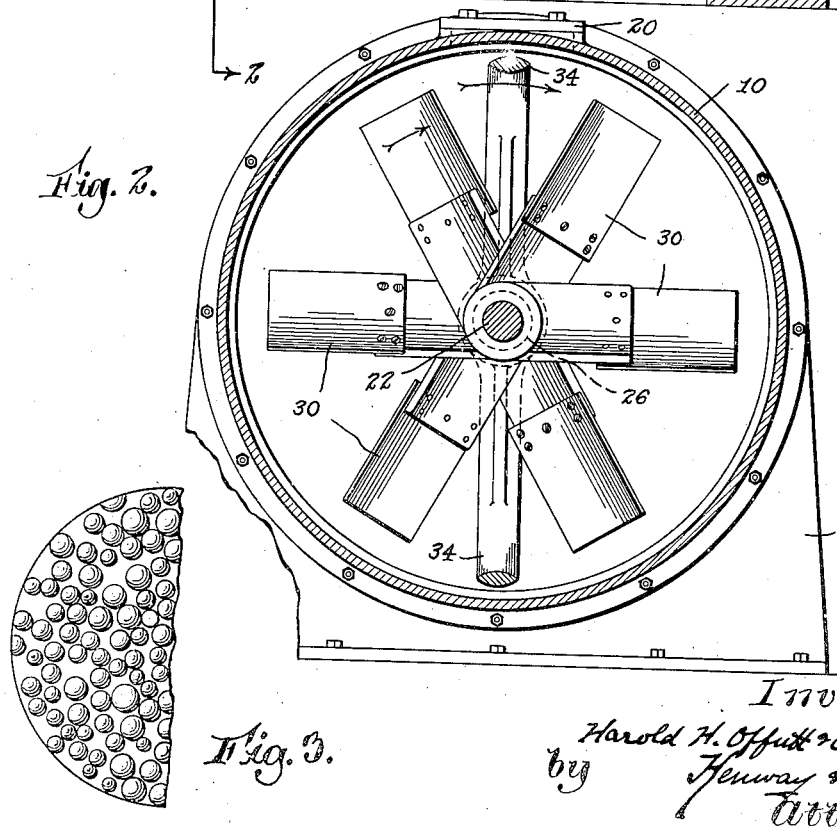
Figure 3:
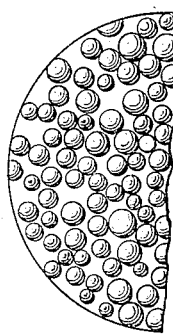

The nature of the invention will be best understood and appreciated from the following description of one form of apparatus which is well adapted for the production of granular carbon black in a substantially spherical form, together with an explanation of its manner of use. In the accompanying drawing, Fig. 1 is a view in longitudinal section of such apparatus;

Fig. 2 is a view in cross section of the apparatus on the line 2—2 of Fig. 1, and Fig. 3 represents carbon black of a preferred spherical form as seen in the field of a microscope, magnified about 50 diameters.

The apparatus comprises a horizontally disposed tank or drum 10 which is formed from a cylindrical shell 10, flanged and bolted to end plates 12 and 16. The end plates are both flanged to provide a firm footing and have outwardly-extending bosses 14 and 18 respectively in which are formed bearings for concentric driven shafts 22 and 26. The inner solid shaft 22 is journaled in the boss 14 of the left-hand end plate 12 and in bearings formed in an outboard standard 24. It is provided at its outer end with a driving pulley 28 and carries within the drum a series of blades 30. As herein shown, six blades are provided spaced longitudinally of the shaft and disposed 60° apart and inclined alternately substantially 45° to their axis of rotation. The blades 30 do not extend to the inner wall of the drum 10 but terminate so as to leave a substantial clearance. For example, in a 14 inch drum the clearance between the ends of the blades and the inner wall of the drum may advantageously be as much as three-quarters of an inch. The provision of an ample clearance is of importance because it prevents the blades from sweeping through carbon black adhering to the inner walls of the drum. Such treatment of the carbon black tends to shear the spherical granules being formed and to form sheared surfaces which are sticky and so inimical to the formation of the preferred spherical grain form of carbon black. The exact arrangement and shape of the blades 30 is of secondary importance. As herein shown, they are inclined alternately in opposite directions but any arrangement of the blades which will produce a turbulent stirring and agitation of the dry carbon black contained in the drum is satisfactory.

At its right-hand end the shaft 22 passes through a short hollow shaft 26 secured at its outer end to a driving pulley 32. Within the drum 10 the inner end of the hollow shaft 26 carries a bail-shaped agitator or scraper 34. This is journaled at its left end upon the shaft 22 and is disposed to rotate slowly in the space between the ends of the blades 30 and the inner wall of the drum 10. The hollow shaft and the scraper 34 are driven at a slow rate by the pulley 32 in the same direction of rotation as the blades 30. It will be noted that a substantial clearance is provided between the scraper 34 and the wall of the drum 10. The principal function of the scraper 34 is to remove from the walls of the drum the carbon black which is built up thereon in the form of a coating and which would otherwise become thick enough to extend within the path of the blades 30. By this arrangement, shearing of the grains by the blades 30 is substantially eliminated and the total amount of shearing in the apparatus is minimized on account of the slow movement of the scraper 34.

In operating the apparatus herein disclosed, the drum 10 may be filled to about one-half its capacity with commercial flocculent carbon black or, as already intimated, a mixture of commercial carbon black with a small quantity of spherical grain carbon black. The charge may be introduced and withdrawn through a hand hole provided in the upper surface of the drum 10 and closed by a cover 20. The two shafts are then set in operation. In a small apparatus, where a 14-inch drum is employed, a speed of approximately 440 R. P. M. for the shaft 22 and the blades 30 has been found suitable for imparting a turbulent agitation to the black contained in the drum. At the same time, the scraper 34 may be rotated at a speed of 16 to 18 R. P. M. in the same direction. The result is that the charge of carbon black is stirred or churned into a state of turbulent agitation, in which the particles are subjected to multi-directional pressure by impact with other particles and by impact against the blades 30 and scraper 34, and impact against the walls of the drum and, under these conditions, there occurs a systematic and progressive agglomeration of the particles upon each other, or upon the granules of the priming charge, and a shaping of the agglomerates into spherical granules having hammered or impact-formed surfaces which present the striking characteristics of dustlessness, high density and non-adherent, free flowing contact with each other. In general, it may be stated that the apparent density of the carbon black granules is quickly brought to approximately 30 pounds per cubic foot. At this density the granules are 200 to 250 mesh in diameter and may be increased in size by the addition of more flocculent carbon black as the process is continued.

The general appearance of a preferred form of the finished product, as seen in the field of a microscope, is represented in Fig. 3. It will be noted that in this particular form the granules may be spherical, or approximately so, and that there is a substantially uniform upper limit of diameter which has been attained by a large number of the granules.

In addition to the characteristics of relatively high density and non-coherent surface, the carbon black granules produced as above outlined are relatively tenacious in their structure. They cannot be crushed between the fingers by normal pressure, although they may be readily crushed against a hard surface or by rubbing which subjects them to shearing stress between the fingers.

The process of our invention may be successfully carried out at moderate temperature. The sticking properties of sheared particles of carbon black tend to disappear as the temperature is increased, but since carbon black will react rapidly with oxygen in the neighborhood of 500° F. it is important to carry out the process well on the safe side of that temperature, since any oxidizing effect in the carbon black alters and impairs those characteristics of the material which are particularly desired in the rubber and printing ink industries. Accordingly, while it may be possible to carry out successfully the process of my invention at a high temperature by taking steps to exclude oxygen from the carbon black, it is preferable to carry out the process below a temperature at which there is tendency to rapid oxidation. For example, in using the illustrated apparatus to convert a charge of commercial carbon black which has not been primed by the addition of spherical-grain carbon black, a temperature of about 400° F. has been found satisfactory. For this purpose the walls of the drum may be heated by any desired or convenient means.

While we have explained to some extent a theory of the formation of the dense, preferably spherical granules which it is the object of our invention to produce, there may be other important factors in the phenomenon of its formation which are not at the present time fully understood. It is undoubtedly true that agglomeration of the particles is retarded by the cushion of air between them at the instant of impact, and that this unfavorable factor is overcome to some extent by imparting a substantial velocity to the particles so that sufficient momentum and pressure of contact are developed to squeeze out the interposed air at their points of contact.

It is, further, probable that the behaviour of the carbon black particles is affected by charges of static electricity carried by them. We are unable to state, from the electrical standpoint, just what is the action of the carbon black particles and how the formation of spherical-grain carbon black is affected by electrical conditions.

Another factor which requires attention is the pressure to which the carbon black charge is subjected during the process of its agglomeration. It is desirable to limit the depth of the charge so that the particles at the bottom of the mass shall not be subjected to too great weight and that the blades of the agitating mechanism shall not encounter too great resistance in creating the desired turbulent agitation of the particles. In the illustrative apparatus, a depth of 7 to 8 inches results in satisfactory pressure conditions. The foregoing disclosure, however, is adequate and complete from the practical standpoint and sufficient to enable one skilled in the art to produce from commercial flocculent carbon black the novel product of manufacture of our invention.

It will be understood that the apparatus herein illustrated and described constitutes only one example of apparatus which we have found suitable for the processes of our invention. Sandy or granular carbon black may be produced from the flocculent carbon black of commerce by employing a ball mill, wherein the mass of carbon black is maintained in a continuous condition of surface flow, with the result that the particles are poured or rolled over each other and caused to agglomerate and take granular form by reason of the rolling contact thus imparted to them. The carbon black particles are so small that the rolling impact to which any point thereof is subjected becomes very appreciable expressed in pounds per square inch of pressure, and the hammered, impact-formed, non-coherent surface desired is produced in this manner and may become polished if continued long enough.

We have found, while operating a large scale apparatus, that the degree of turbulence created is of prime importance because too great a degree of turbulence, that is to say, too rapid motion of one particle with respect to its neighbors, especially when all are subjected to pressure due to the weight of other particles above them or to centrifugal pressure or to other mechanical or gravitational causes, tends to create a shearing effect between particles which is quite as detrimental to the successful carrying out of the process as is the shearing effect between the particles on the rapidly moving blades or the stationary walls of the apparatus. It should be noted, therefore, that the differential speed between the particles of carbon black within adjacent zones of the apparatus must not be excessive. We have found that by careful attention to these factors it is possible to eliminate a scraper bar corresponding to that shown in the illustrated apparatus, that is, that at a certain clearance between the moving blades and the stationary wall and at a certain speed of revolution, the differential speeds of the carbon black particles will be such as practically to eliminate the objectionable shearing effect. While the scraper may be eliminated under these conditions, it is a desirable and convenient safeguard for commercial operation.

In referring to the multi-directional pressures to which the carbon black particles are subjected, it appears probable that such impacts or pressures should not occur twice in succession in the same direction. The novel product herein disclosed is not herein claimed but forms the subject matter of our application Serial No. 684,884, filed August 12, 1933.

Having thus described our invention, what we claim as new and desire to secure by Letters Patent is:

1. A process of producing carbon black in the form of granules of sufficient density and cohesion to withstand handling in bulk without disintegration, which consists in confining a mass of flocculent carbon black of commerce in a horizontal drum, subjecting it to turbulent agitation by passing rotary blades through the mass and simultaneously scraping the sides of the container to remove wall cake therefrom and continuing such agitation until the carbon black agglomerates into granules which are self-sustaining but capable of disintegration under shearing pressure.

2. A process of transforming flocculent carbon black into a substantially dustless mass of free flowing, relatively tenacious, self-sustaining granules, transportable in bulk without disintegration, which consists in subjecting such carbon black in a dry state to turbulent agitation by rotating at substantial speed a series of relatively broad blades through a mass of said carbon black in a closed drum, said blades being in staggered relation, with the surface of revolution thereof adjacent to and substantially uniformly spaced from the wall of the drum, whereby the entire mass of said black within the container is maintained in a state of substantially perfect turbulence, and continuing such turbulent agitation until said black assumes the form of granules as above defined.

3. A process of transforming flocculent carbon black into a substantially dustless mass of free flowing, relatively tenacious, self-sustaining granules, transportable in bulk without disintegration, which consists in subjecting particles of such carbon black in a dry state to multi-directional impact with other carbon black particles by turbulent agitation thereof by rotating at substantial speed through a mass of said carbon black in a closed drum a series of relatively broad blades with faces of successive blades inclined in opposite directions in relation to the axis of rotation and with the surface of revolution thereof adjacent to and substantially uniformly spaced from the wall of the drum, whereby the entire mass of said carbon black is maintained in a state approaching perfect turbulence, and continuing such turbulent agitation until said carbon black is converted into granules as above defined.

4. A process of treating flocculent carbon black, which consists in maintaining said carbon black in a state approaching perfect turbulence by rotating a series of relatively broad blades at substantial speed through a mass of said carbon black in a drum, the faces of alternate blades being at different angles to the axis of rotation, and thereby subjecting all parts of said mass to turbulent agitation, and simultaneously scraping and maintaining free from wall cake the wall of said drum, all as and for the purpose described.

EDMUND BILLINGS.
HAROLD H. OFFUTT.